US 9,768,866 B2

(12) United States Patent
Park et al.

(10) Patent No.: US 9,768,866 B2
(45) Date of Patent: Sep. 19, 2017

(54) OPTICAL WAVELENGTH AND POWER MEASUREMENT DEVICE

(71) Applicant: ELECTRONICS AND TELECOMMUNICATIONS RESEARCH INSTITUTE, Daejeon (KR)

(72) Inventors: hyoungjun Park, Gwangju (KR); Kwon-Seob Lim, Gwangju (KR); Hyun Seo Kang, Gwangju (KR); Jaisang Koh, Gwangju (KR); Keo-Sik Kim, Gwangju (KR); Young Sun Kim, Gwangju (KR); Jeong Eun Kim, Gwangju (KR); Ji Hyoung Ryu, Jeonju (KR); Eun Kyoung Jeon, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 138 days.

(21) Appl. No.: 14/797,030

(22) Filed: Jul. 10, 2015

(65) Prior Publication Data
US 2016/0146663 A1    May 26, 2016

(30) Foreign Application Priority Data
Nov. 26, 2014   (KR) .......................... 10-2014-0166877

(51) Int. Cl.
*G01J 1/04*     (2006.01)
*H04B 10/079*   (2013.01)

(52) U.S. Cl.
CPC . *H04B 10/07957* (2013.01); *H04B 10/07955* (2013.01)

(58) Field of Classification Search
CPC .............. H04B 10/71; H04B 10/07955; H04B 10/07957
(Continued)

(56) References Cited

U.S. PATENT DOCUMENTS 6,587,214 B1    7/2003   Munks
9,490,899 B1 *  11/2016  Nguyen .............. H04B 10/118
(Continued)

FOREIGN PATENT DOCUMENTS

EP    1 691 495 A1    8/2006
KR    20-0385979 Y1   6/2005
(Continued)

OTHER PUBLICATIONS

Hyoungjun Park et al., "Handheld type multi-functional DWDM optical instruments using an ultrasonic PZT linear motor", The 24th Photonics Conference 2014/TP-V10, Nov. 26, 2014, pp. 371-372.

*Primary Examiner* — Kevin Pyo

(57) ABSTRACT

An optical wavelength and optical power measurement device is provided. The optical wavelength and optical power measurement device includes: an input unit in which an optical connector that emits communication light of an infrared ray wavelength region is connected; a filter unit that separates the communication light of an infrared ray wavelength region and light of a visible ray wavelength region; a sensing unit that communicates with a path of the communication light of an infrared ray wavelength region of the filter unit and in which a signal of the communication light of an infrared ray wavelength region is input; and an inspection unit that communicates with a path of the light of the visible ray wavelength region of the filter unit and that inspects a surface of the optical connector.

13 Claims, 5 Drawing Sheets

(58) Field of Classification Search
USPC .......... 250/205, 216; 372/28, 32; 398/34, 38
See application file for complete search history.

(56) References Cited

U.S. PATENT DOCUMENTS

2012/0127458 A1   5/2012  Lim et al.
2013/0034357 A1   2/2013  Lim
2013/0294768 A1  11/2013  Lee et al.

FOREIGN PATENT DOCUMENTS

| KR | 10-0758695 B1 | 9/2007 |
| KR | 10-0820947 B1 | 4/2008 |
| KR | 10-2008-0097645 A | 11/2008 |
| KR | 10-2011-0037428 A | 4/2011 |
| KR | 10-2011-0070598 A | 6/2011 |
| KR | 10-2012-0054932 A | 5/2012 |
| KR | 10-2013-0131039 A | 12/2013 |

* cited by examiner

OPTICAL WAVELENGTH AND POWER MEASUREMENT DEVICE

CROSS-REFERENCE TO RELATED APPLICATION

This application claims priority to and the benefit of Korean Patent Application No. 10-2014-0166877 filed in the Korean Intellectual Property Office on Nov. 26, 2014, the entire contents of which are incorporated herein by reference.

BACKGROUND OF THE INVENTION (a) Field of the Invention

The present invention relates to an optical wavelength and optical power measurement device. More particularly, the present invention relates to an optical wavelength and optical power measurement device using a sensing unit that is formed with a Dense Wavelength Division Multiplexing (DWDM) wavelength filter and a micro motor.

(b) Description of the Related Art

Nowadays, due to development of high speed Internet and increase of Internet traffic, transmitting capacity is being continuously increased. In order to satisfy the rapidly increasing transmitting capacity, by replacing old equipment with the latest equipment, Internet service providers are preparing for a future explosive increase in traffic, but due to a rapid increase in Internet Protocol Television (IPTV) service subscribers and high speed mobile communication networks such as a wideband Long Term Evolution (LTE) network, a high speed large capacity communication bandwidth is required.

In the late 1990s, a Wavelength Division Multiplexing (WDM) transmission system had a wavelength number of about 4 channels and 16 channels, a gap between channels of 200 GHz, and a transmission speed per channel of 2.5 Gbps, but currently, a demand for DWDM technology having 40-80 channels, a transmission speed of 10 Gbps or more, and a small channel gap of 50 GHz or 100 GHz is increasing.

Optical measurement technology includes the following measurement technology and measurement equipment.

That is, technology that measures intensity of an optical source is technology that changes and measures intensity of light with respect to an electrical signal using a photodiode made with a material such as Ge, InGaAs, and GaAs, and includes an optical power meter as measurement equipment.

Because a photodiode has different receiving sensitivity according to a wavelength, when an existing optical power meter previously discerns a wavelength of a light signal to measure for accurate measurement and measures optical power according to receiving sensitivity corresponding to the wavelength, the existing optical power meter can obtain an accurate value. A method of calculating final optical power by previously inputting a calibration of several much-used wavelengths such as 850 nm, 980 nm, 1310 nm, 1480 nm, 1550 nm, and 1610 nm and by multiplying the calibration by a measured optical power value has been generally used.

In a recent research result, as a method that is advanced from such a method, a method of using a wavelength dependant photodiode and a method of separately measuring optical power and an optical wavelength using an optical coupler and displaying an optical power value of a corresponding wavelength have been reported. Further, technology that analyzes the spectrum of light analyzes the spectrum according to a wavelength of light. Currently, a method of using rotated grating is generally used, but equipment thereof is expensive and is weak with respect to vibration.

As the equipment, an optical spectrum analyzer (OSA) is mostly used, and as equipment that accurately measures only a wavelength of light, a wavelength meter is used. Equipment that measures such an optical wavelength requires elaborate optical technology and a complex process, and thus the equipment has a drawback in that it has a large volume and high power consumption and that is weak against impact.

For reliable management of an optical subscriber network, monitoring of a wavelength and power of a light source depending on aging or a temperature change, wavelength alignment with a light source and a passing band of an MUX and DMUX that are affected by a peripheral temperature, and an optical fiber cutting situation of a transmitting line should be performed.

Upon installation and maintenance of an optical subscriber network to be performed in the future, when simply measuring only optical power, there are several difficulties. That is, E/G-PON technology, WDM-PON technology, or CWDM-PON technology should accurately ascertain a wavelength used as well as power of the wavelength.

At present, as equipment that can measure such an optical wavelength, an Optical Spectrum Analyzer (OSA) is used, but it may be used in a laboratory, and while it has been launched with a small size having mobility, a hand held type of unit thereof does not exist at present. The OSA is very expensive equipment at about 10,000-50,000 US dollars, and thus when configuring a network, the OSA may not be used in an external environment.

In general, an optical power meter is essential equipment for installation, inspection, and measurement of an optical communication system, and is used for determining whether power of a transmitting light signal and power of a receiving light signal are transmitted and received with appropriate intensity (optical power) of a light signal. A conventional optical power meter is a small and light measurement device and has been usefully used. Up to now, for communication, a wavelength of 1310 nm and a wavelength of 1550 nm have been mainly used. Particularly, in a subscriber network, a wavelength of 1310 nm is generally used.

However, it is expected that use of optical subscriber network equipment using a multi-wavelength will be rapidly increased. That is, because a WDM-Passive Optical Network (WDMPON), an E-PON, and a Coarse WDM-Passive Optical Network (CWDM-PON) system, which are optical subscriber network equipment that are commercially available, measurement equipment thereof is also required. When a wavelength of light to measure is known, a conventional optical power meter may perform accurate measurement.

As described above, for maintenance of a rapidly increasing DWDM optical communication system and transmission line, demand for a portable DWDM optical wavelength and optical power measurement device increases, but a conventional optical wavelength and optical power measurement device has only an optical wavelength and optical power measuring function, so when knowing a wavelength to measure, the conventional optical wavelength and optical power measurement device may measure accurate optical power, but it is difficult to produce a portable optical measurement device having a ferrule cross-section inspection function of an optical connector in the field in view of an existing DWDM wavelength filter module structure.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide an optical wavelength and optical power measurement device having an inexpensive price and maximized portability, for measuring an optical wavelength and optical power, and having an inspection function of a ferrule cross-section of an optical connector.

An exemplary embodiment of the present invention provides an optical wavelength and optical power measurement device including: an input unit in which an optical connector that emits communication light of an infrared ray wavelength region is connected; a filter unit that is connected to the input unit and that separates the communication light of an infrared ray wavelength region that is emitted from the optical connector and light of a visible ray wavelength region; a sensing unit that communicates with a path of the communication light of an infrared ray wavelength region of the filter unit and in which a signal of the communication light of an infrared ray wavelength region is input; an inspection unit that communicates with a path of the light of the visible ray wavelength region of the filter unit and that inspects a surface of the optical connector that is connected to the input unit; a signal processor that is connected to the sensing unit and the inspection unit and that processes a signal that is output from the sensor unit and the inspection unit; and a monitor unit that is connected to the signal processor and that displays a processed signal of the signal processor.

The inspection unit may include: a light source unit that emits light of the visible ray wavelength region; and an image detection microscope that inspects a surface of the optical connector that is radiated by the light source unit.

The sensing unit may include: at least one linear motor; a plurality of Dense Wavelength Division Multiplexing (DWDM) wavelength filters that are mounted on a mounting unit that is connected to the linear motor; and an optical detector that detects the communication light of an infrared ray wavelength region, having passed through the plurality of DWDM wavelength filters, wherein the at least one linear motor may be disposed frontward and rearward, and the plurality of DWDM wavelength filters may be arranged at equal intervals that are smaller than a diameter of the optical detector on a structure.

The plurality of DWDM wavelength filters may be mounted while having a separation portion that is separated so that the optical detector is exposed to communication light of the infrared ray wavelength region in a start stage of the mounting unit, and the separation portion may be arranged in parallel to the optical detector.

In the at least one linear motor, each linear motor may be sequentially operated, and after an initial linear motor terminates operation and returns to a first location, a following linear motor may operate.

The sensing unit may include: a plurality of rotary motors; a plurality of DWDM wavelength filters that are mounted on a circular mounting unit that is installed on the rotary motors; and an optical detector that detects the communication light of an infrared ray wavelength region, having passed through the plurality of DWDM wavelength filters at the center of the circular mounting unit, wherein the circular mounting units may be disposed to face each other, and the plurality of DWDM wavelength filters may be disposed to overlap between the circular mounting units and to be arranged at equal intervals that are smaller than a diameter of the optical detector.

The plurality of DWDM wavelength filters may be disposed in a circular shape in the circular mounting unit, and the optical detector may be mounted in a circular shape having an opening portion in which a portion is opened to expose communication light of the infrared ray wavelength region, and the opening portion may be arranged in parallel with the optical detector.

In the plurality of rotary motors, each rotary motor may sequentially operate, and after an initial rotary motor terminates operation and returns to a first location, a second rotary motor may operate.

The communication light of an infrared ray wavelength region may be formed as short wavelength or multi-wavelength light.

The plurality of rotary motors and the circular mounting unit may have different sizes.

In exemplary embodiments of the present invention, because a filter unit and an inspection unit are included, it can be determined without using other devices whether a cross-section of an optical connector is contaminated.

Further, by forming a sensing unit by combining one or more motors, and DWDM wavelength filters are mounted in parallel, a size of an optical wavelength and optical power measurement device can be reduced.

Further, by counting a signal of light by sequentially mounting a plurality of DWDM wavelength filters at equal intervals, a DWDM wavelength filter having the same wavelength as that of an input communication light source of an infrared ray wavelength region is selected and thus an input wavelength can be easily selected.

Further, through simplification of the above structure, mass production can be easily performed and an optical wavelength and optical power measurement device can be produced with an inexpensive price.

DETAILED DESCRIPTION OF THE EMBODIMENTS

Figure 1:
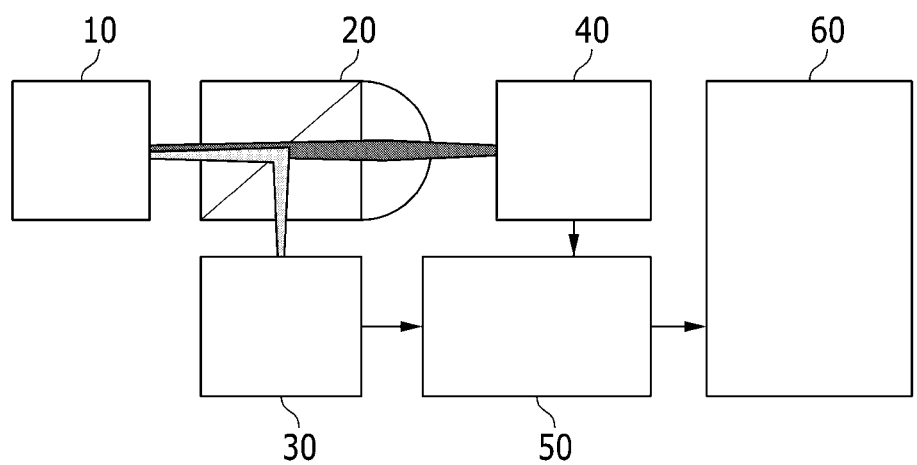
FIG. 1 is a diagram illustrating a configuration of an optical wavelength and optical power measurement device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in the drawings, a size and thickness of each element are arbitrarily represented for better understanding and ease of description, and the present invention is not limited thereto.

In addition, unless explicitly described to the contrary, the word "comprise" and variations such as "comprises" or "comprising" will be understood to imply the inclusion of stated elements but not the exclusion of any other elements.

FIG. 1 is a diagram illustrating a configuration of an optical wavelength and optical power measurement device according to an exemplary embodiment of the present invention.

Referring to FIG. 1, in an optical wavelength and optical power measurement device of the present exemplary embodiment, a filter unit 20 may be connected to an input unit 10 to which an optical connector that emits communication light of an infrared ray wavelength region is connected. After the communication light of an infrared ray wavelength region passes through the filter unit 20, a sensing unit 40 that is connected to the filter unit 20 may output an electrical signal. The electrical signal is processed in a signal processor 50 to be displayed by a monitor unit 60.

The communication light of an infrared ray wavelength region that is emitted by the input unit 10 may be short wavelength or multi-wavelength light as infrared ray communication light of a DWDM wavelength band.

The filter unit 20 may perform a function of dispersing light of a visible ray wavelength for determining whether an optical connector is contaminated and passes an input infrared ray wavelength without wavelength interference. Therefore, light of a visible ray wavelength region is not input to the sensing unit 40 that is connected to the filter unit 20, and the sensing unit 40 may only sense light of an infrared ray wavelength region. Here, the filter unit 20 may be a Wavelength Division Multiplexing (WDM) filter.

An inspection unit 30 may include a light source unit that emits light of a visible ray wavelength region that radiates from a surface of an optical connector of a communication light source that is connected to the input unit 10. The light source unit may be a light emitting diode (LED) light source. Further, the inspection unit 30 may include a microscope that can inspect a surface of the optical connector from which light of a visible ray wavelength region is radiated. Here, the microscope may be a Charge Coupled Device (CCD) microscope.

When a light source unit of the inspection unit 30 radiates LED light of a visible ray wavelength region to a cross-section of the optical connector, the LED light is reflected from a cross-section of the optical connector to the microscope of the inspection unit to detect a cross-sectional image of the optical connector. The microscope may transmit the detected image to the signal processor 50.

The sensing unit 40 may detect communication light of an infrared ray wavelength region that is input by passing through the filter unit 20 to transmit a signal thereof to the signal processor 50. The sensing unit 40 may transmit a signal of the communication light and a control state of a motor that is included in the sensing unit 40 to be described later to the signal processor 50.

The signal processor 50 may process a ferrule cross-section image of an optical connector that is received from the sensing unit 40 and the inspection unit 30, a control state of the motor, and a signal of the communication light source to transmit the image, the control state, and the signal to the monitor unit 60.

Through the monitor unit 60, an operator may measure an optical wavelength and optical power of the optical connector of the communication light source of an infrared ray wavelength region in the field.

Figure 2:
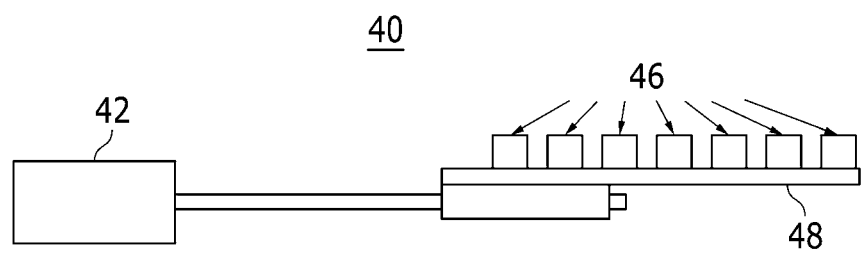
FIG. 2 is a cross-sectional view illustrating a configuration of a sensing unit of an optical wavelength and optical power measurement device according to a first exemplary embodiment of the present invention.
Figure 3:
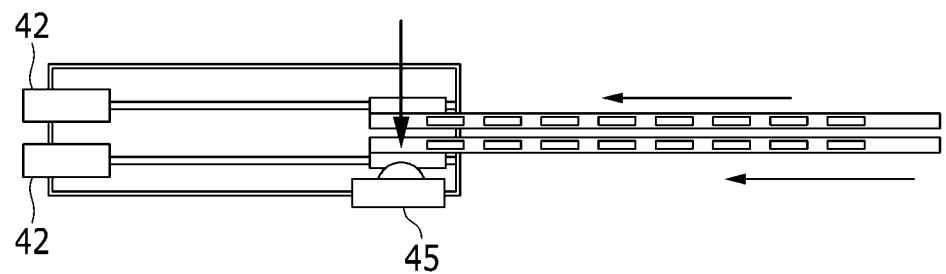
FIG. 3 is a top plan view illustrating a configuration of a sensing unit of an optical wavelength and optical power measurement device according to a first exemplary embodiment of the present invention.
Figure 4:
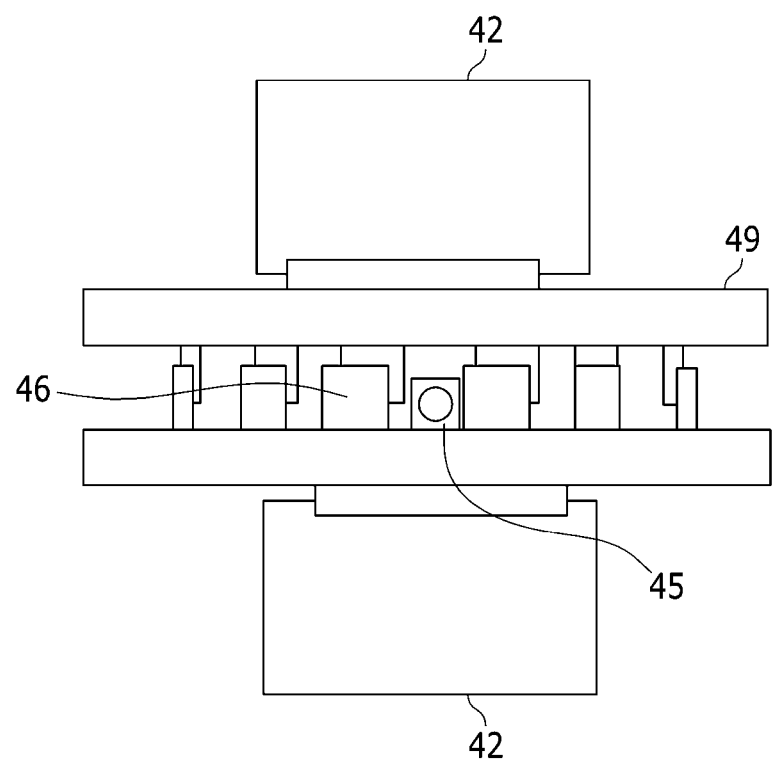
FIG. 4 is a cross-sectional view illustrating a configuration of a sensing unit of an optical wavelength and optical power measurement device according to a second exemplary embodiment of the present invention.
Figure 5:
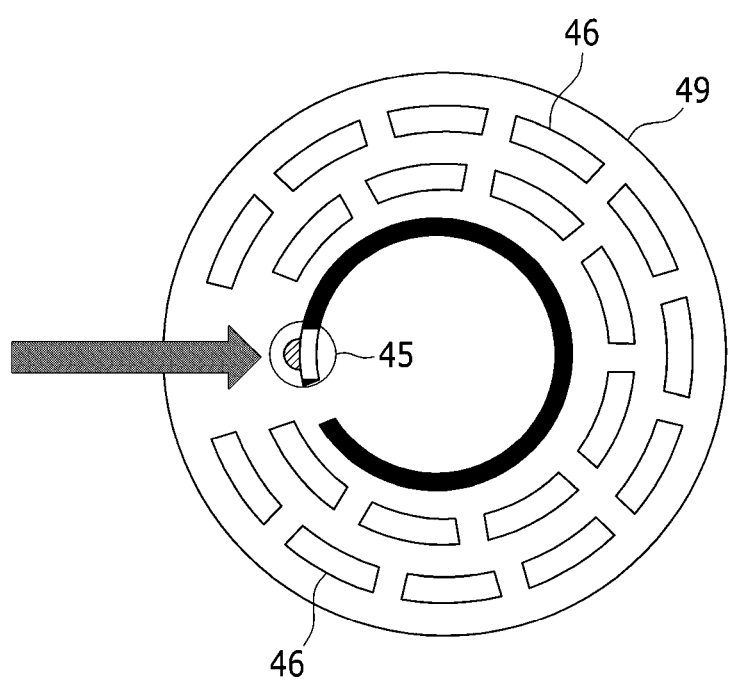
FIG. 5 is a top plan view illustrating a configuration of a sensing unit of an optical wavelength and optical power measurement device according to a second exemplary embodiment of the present invention.

FIG. 2 is a cross-sectional view illustrating a configuration of a sensing unit 40 of an optical wavelength and optical power measurement device according to a first exemplary embodiment of the present invention. FIG. 3 is a top plan view illustrating a configuration of a sensing unit 40 of an optical wavelength and optical power measurement device according to a first exemplary embodiment of the present invention.

Referring to FIGS. 2 and 3, a linear motor 42 may be applied to the sensing unit 40. A mounting unit 48 is provided to the linear motor 42, and a plurality of DWDM wavelength filters 46 may be sequentially mounted at equal intervals on the mounting unit 48. The mounting unit 48 may move frontward and rearward based on the linear motor 42. Communication light of an infrared ray wavelength region that is input by this movement may pass through the plurality of DWDM wavelength filters 46.

When multiple linear motors 42 are disposed, each linear motor 42 may sequentially operate. That is, after an initial linear motor 42 terminates operation and returns to a first location, a following linear motor 42 operates.

When a plurality of DWDM wavelength filters 46 that are mounted to one linear motor 42 are mounted in two or more linear motors 42, the plurality of DWDM wavelength filters 46 can be disposed in parallel and thus a size of the sensing unit 40 and a size of an optical wavelength and optical power measurement device can be reduced. This is applied to the rotary motor 42.

For example, when a plurality of DWDM wavelength filters 46 are separately installed at a start stage of the mounting unit 48 and when a communication light source of an infrared ray wavelength region that is input through a separated separation portion (not shown) is arranged in parallel to the optical detector, a location of the mounting unit 48 may be detected. That is, at the first start, input communication light of an infrared ray wavelength region is directly input to an optical detector 45 without passing through the plurality of DWDM wavelength filters 46. Thereby, the signal processor 50 may recognize a first location.

A plurality of sequentially mounted DWDM wavelength filters 46 may differently form a wavelength that each DWDM wavelength filter 46 allows to pass. That is, as the DWDM wavelength filters 46 are sequentially disposed at equal intervals, unfiltered communication light of an infrared ray wavelength region at a first location is applied and then the linear motor 42 operates and thus communication light of an infrared ray wavelength region is sequentially applied to each DWDM wavelength filter 46, such that the DWDM wavelength filter 46 corresponding to a wavelength of a communication light source of an infrared ray wavelength region may be selected.

Specifically, communication light of an infrared ray wavelength region of a short wavelength or a multi-wavelength is first applied to the optical detector 45 without interference of the DWDM wavelength filter 46, and thus a first location may be recognized. Thereafter, a plurality of DWDM wavelength filters 46 that are sequentially mounted and having a predetermined wavelength region move with operation of the linear motor 42. The applied communication light of an infrared ray wavelength region sequentially passes through the plurality of DWDM wavelength filters 46. In this case, when a wavelength of communication light that is applied to the DWDM wavelength filter 46 is different from a wavelength region of the DWDM wavelength filter 46, the DWDM wavelength filter 46 operates as a cover film and thus a signal of light is not detected in the optical detector 45. When a wavelength of communication light of an infrared ray wavelength region is the same as that of a wavelength region of the DWDM wavelength filter 46, the applied communication light of an infrared ray wavelength region may pass through the DWDM wavelength filter 46. The communication light of an infrared ray wavelength region, having passed through the DWDM wavelength filter 46, is detected through the optical detector 45.

Here, unfiltered communication light, having passed between the DWDM wavelength filters 46, performs an index function that can track a location of a sequentially mounted plurality of DWDM wavelength filters 46. Therefore, after unfiltered first communication light of an infrared ray wavelength region is applied, a following communication light source does not pass through a plurality of DWDM wavelength filters 46 having different wavelength regions, and a signal of light is not detected through the optical detector 45. The operation in which unfiltered communication light of an infrared ray wavelength region, having passed through between the plurality of DWDM wavelength filters 46, is repeated. Thereafter, when communication light passes through the DWDM wavelength filter 46 having the same wavelength region, the optical detector 45 may detect a signal of light having passed through the DWDM wavelength filter 46. In this way, a gap between an end portion of the mounting unit 48 and a separated separation portion (not shown) of the first DWDM wavelength filter 46 and each DWDM wavelength filter 46 performs an index function of searching for a wavelength of applied communication light. A signal of light that is detected by the optical detector 45 may select the DWDM wavelength filter 46. That is, communication light of the same infrared ray wavelength as a wavelength of the DWDM wavelength filter 46 may be detected.

The optical detector 45 is located behind the DWDM wavelength filter 46, and is located at the center of a circular mounting unit 49. Further, the optical detector 45 may be a photodiode. A diameter of the photo diode may be 1 mm to 2 mm. As described above, by counting signals of light that is detected from the optical detector 45, it may be determined when light is detected after which number wavelength filter, and a signal is transmitted to the signal processor 50.

A motor of the sensing unit 40 may be formed with a rotary motor 42. In the rotary motor 42, the circular mounting unit 49 may be provided. When two rotary motors 42 are installed, each rotary motor is vertically disposed, and the circular mounting unit 49 that is provided in each rotary motor may have different sizes. A plurality of DWDM wavelength filters 46 are mounted in a circular shape along a circumference of the circular mounting unit 49. A plurality of DWDM wavelength filters 46 that are mounted in the circular mounting unit 49 of the first rotary motor 42 and the circular mounting unit 49 of the second rotary motor 42 may be disposed to be overlapped. Further, a size of each circular mounting unit 46 may be different.

When two rotary motors 42 are disposed, each rotary motor 42 may sequentially operate. After the first rotary motor terminates operation and returns to a first location, the second rotary motor may operate.

A plurality of DWDM wavelength filters 46 may be mounted in a circular shape having an opening portion (not shown) in which a portion is opened on the circular mounting unit 49. A communication light source of an infrared ray wavelength region passing through the opening portion (not shown) and the optical detector 45 may be arranged in parallel. In this case, a first detection location is a first location of a circular mounting unit. That is, at a first location, communication light of an infrared ray wavelength region that is input to an input unit is directly input to the optical detector 45 without passing through a plurality of DWDM wavelength filters 46 that are mounted in an external circumferential surface of the circular mounting unit 49. Thereby, the signal processor 50 may recognize a first location.

A plurality of DWDM wavelength filters 46 that are mounted in a circular shape having an opening portion at which a portion is opened may be sequentially disposed at equal intervals. At a first location, communication light that is not filtered in the DWDM wavelength filter is applied. Thereafter, as the first rotary motor is operated, communication light of an infrared ray wavelength region is sequentially applied to each DWDM wavelength filter 46 and thus the DWDM wavelength filter 46 corresponding to communication light of an infrared ray wavelength region may be selected.

The DWDM wavelength filter 46 is a dense wavelength division multiplexing interference filter, and by transmitting a plurality of wavelengths of 8 channels or more through a single optical wave and by forming each wavelength in one channel, each signal is transmitted with a separated intrinsic optical wavelength with technology that maximizes and loads a capacity of an optic fiber and is thus used as a communication light source. According to exemplary embodiments of the present invention, it is preferable for a DWDM wavelength filter to have about 40 channels.

Further, the DWDM wavelength filter 46 may be disposed at equal intervals with a gap that is smaller than a diameter of the optical detector 45. The same area as a diameter of the optical detector 45 or an area smaller than a diameter of the optical detector 45 is referred to as an active area, and in this case, accurate measurement may be expected. Therefore, by measuring a signal of light that is measured by operation of the linear or rotary motor 42 by sequentially disposing the DWDM wavelength filter 46 equal intervals, a location of the accurate DWDM wavelength filter 46 is selected and thus measurement of optical wavelength and optical power may be expected.

Figure 6:
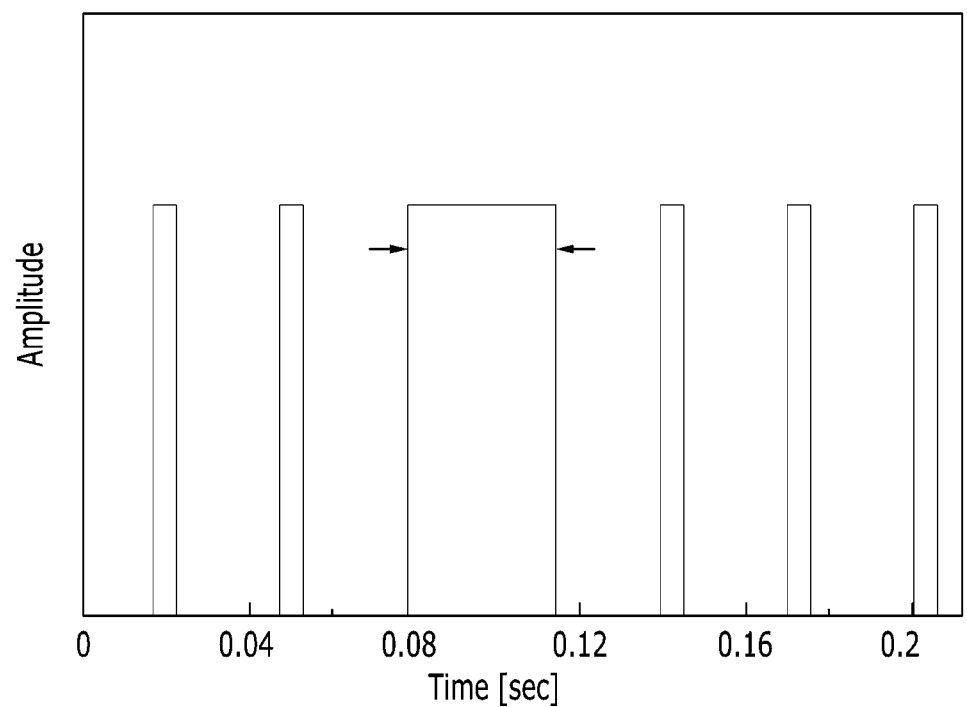
FIG. 6 is a graph illustrating a signal of light that is detected by an optical detector of a sensing unit of an optical wavelength and optical power measurement device according to exemplary embodiments of the present invention.

FIG. 6 is a graph illustrating a signal of light that is detected by the optical detector 45 of the sensing unit 40 of an optical wavelength and optical power measurement device according to exemplary embodiments of the present invention.

Referring to FIG. 6, when an optical wavelength and optical power measurement device of the present exemplary embodiment operates at 0 s, the optical detector 45 determines a communication light source of an infrared ray wavelength region that is input through the input unit 10 within 0 s-0.04 s with a signal of first light. Thereafter, the linear or rotary motor 42 operates, and a signal of unfiltered second light, having passed through a gap between the DWDM wavelength filter 46 within 0.04-0.06 s, is detected.

After a signal of first light is detected, until a signal of second light is detected, by passing through the first DWDM wavelength filter 46 different from an input communication light source of an infrared ray wavelength region, light is not detected. Thereafter, after a signal of second light is detected, until a signal of third light is detected, by passing through the second DWDM wavelength filter 46 having a different wavelength from that of an input communication light source of an infrared ray wavelength region, light is not detected.

However, thereafter, a signal of light is detected with different strength from existing strength within 0.08 s-0.12 s. By passing through the third DWDM wavelength filter 46 having the same wavelength as that of an input communication light source of an infrared ray wavelength region, a signal of light is detected through the optical detector 45. While detecting, the signal processor 50 may determine the number DWDM wavelength filter after first start and transmit a signal of a DWDM wavelength to the monitor unit 60. An operator may be determined through the monitor unit 60. Thereafter, by determining a signal of light while passing through a communication light source, having been applied to a plurality of DWDM wavelength filters 46 having determined wavelengths, such as a signal of fourth light and a signal of fifth light, it is determined whether a selected DWDM wavelength filter is correctly selected.

In this way, the signal processor 50 may transmit through a plurality of DWDM wavelength filters 46 that are sequentially mounted at equal intervals, and a detection time and detection strength of a signal of light that is detected from the optical detector 45 to the monitor unit 60 may be determined.

Thereby, a structure can be simplified, mass production can be easily performed, and an optical wavelength and optical power measurement device of a low price can be produced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: input unit
20: filter unit
30: inspection unit
40: sensing unit
42: motor (linear motor, rotary motor)
45: optical detector
46: DWDM wavelength filter
48: mounting unit
49: circular mounting unit
50: signal processor
60: monitor unit

What is claimed is:

1. An optical wavelength and optical power measurement device, comprising:
    an input unit to which an optical connector that emits communication light of an infrared ray wavelength region is connected;
    a filter unit that is connected to the input unit and that separates the communication light of an infrared ray wavelength region that is emitted from the optical connector and light of a visible ray wavelength region;
    a sensing unit that communicates with a path of the communication light of an infrared ray wavelength region of the filter unit and to which a signal of the communication light of an infrared ray wavelength region is input;
    an inspection unit that communicates with a path of the light of a visible ray wavelength region of the filter unit and that inspects a surface of the optical connector that is connected to the input unit;
    a signal processor that is connected to the sensing unit and the inspection unit and that processes signals that are output from the sensor unit and the inspection unit; and
    a monitor unit that is connected to the signal processor and that displays a processed signal of the signal processor,
    wherein the sensing unit comprises:
        at least one linear motor;
        a mounting unit that is connected to the linear motor;
        a plurality of Dense Wavelength Division Multiplexing (DWDM) wavelength filters that are mounted on the mounting unit; and
        an optical detector that detects the communication light of an infrared ray wavelength region, having passed through the plurality of DWDM wavelength filters.

2. The optical wavelength and optical power measurement device of claim 1, wherein the inspection unit comprises:
    a light source unit that emits the light of a visible ray wavelength region to the optical connector; and
    a microscope that inspects the surface of the optical connector using reflected light of a visible ray wavelength region from the optical connector.

3. The optical wavelength and optical power measurement device of claim 1,
    wherein the at least one linear motor is disposed frontward and rearward, and the plurality of DWDM wavelength filters are sequentially arranged at equal intervals that are smaller than a diameter of the optical detector on a structure.

4. The optical wavelength and optical power measurement device of claim 3, wherein the plurality of DWDM wavelength filters are mounted while having a separation portion that is separated so that the optical detector is exposed to the communication light of an infrared ray wavelength region in a start stage of the mounting unit, and the separation portion is arranged in parallel to the optical detector.

5. The optical wavelength and optical power measurement device of claim 3, wherein in the at least one linear motor, each linear motor sequentially operates, and after an initial linear motor terminates an operation and returns to a first location, a following linear motor operates.

6. An optical wavelength and optical power measurement device, comprising:
    an input unit to which an optical connector that emits communication light of an infrared ray wavelength region is connected;
    a filter unit that is connected to the input unit and that separates the communication light of an infrared ray wavelength region that is emitted from the optical connector and light of a visible ray wavelength region;
    a sensing unit that communicates with a path of the communication light of an infrared ray wavelength region of the filter unit and to which a signal of the communication light of an infrared ray wavelength region is input;
an inspection unit that communicates with a path of the light of a visible ray wavelength region of the filter unit and that inspects a surface of the optical connector that is connected to the input unit;
a signal processor that is connected to the sensing unit and the inspection unit and that processes signals that are output from the sensor unit and the inspection unit; and
a monitor unit that is connected to the signal processor and that displays a processed signal of the signal processor,
wherein the sensing unit comprises:
a plurality of rotary motors;
a circular mounting unit that is connected to the plurality of rotary motors;
a plurality of DWDM wavelength filters that are mounted on the circular mounting unit; and
an optical detector that detects the communication light of an infrared ray wavelength region, having passed through the plurality of DWDM wavelength filters at the center of the circular mounting unit.

7. The optical wavelength and optical power measurement device of claim 6, wherein the plurality of DWDM wavelength filters are disposed in a circular shape in the circular mounting unit, and
wherein the optical detector is mounted in a circular shape having an opening portion in which a portion is opened to expose the communication light of an infrared ray wavelength region, and the opening portion is arranged in parallel with the optical detector.

8. The optical wavelength and optical power measurement device of claim 6, wherein in the plurality of rotary motors, each rotary motor sequentially operates, and after an initial rotary motor terminates an operation and returns to a first location, a second rotary motor operates.

9. The optical wavelength and optical power measurement device of claim 1, wherein the communication light of an infrared ray wavelength region is formed as short wavelength or multi-wavelength light.

10. The optical wavelength and optical power measurement device of claim 6, wherein the plurality of rotary motors and the circular mounting unit have different sizes.

11. The optical wavelength and optical power measurement device of claim 6, wherein the inspection unit comprises:
a light source unit that emits the light of a visible ray wavelength region to the optical connector; and
a microscope that inspects the surface of the optical connector using reflected light of a visible ray wavelength region from the optical connector.

12. The optical wavelength and optical power measurement device of claim 6, wherein the circular mounting units are disposed to face each other, and the plurality of DWDM wavelength filters are disposed to overlap between the circular mounting units and are sequentially arranged at equal intervals that are smaller than a diameter of the optical detector.

13. The optical wavelength and optical power measurement device of claim 6, wherein the communication light of an infrared ray wavelength region is formed as short wavelength or multi-wavelength light.

\* \* \* \* \*